UNITED STATES PATENT OFFICE.

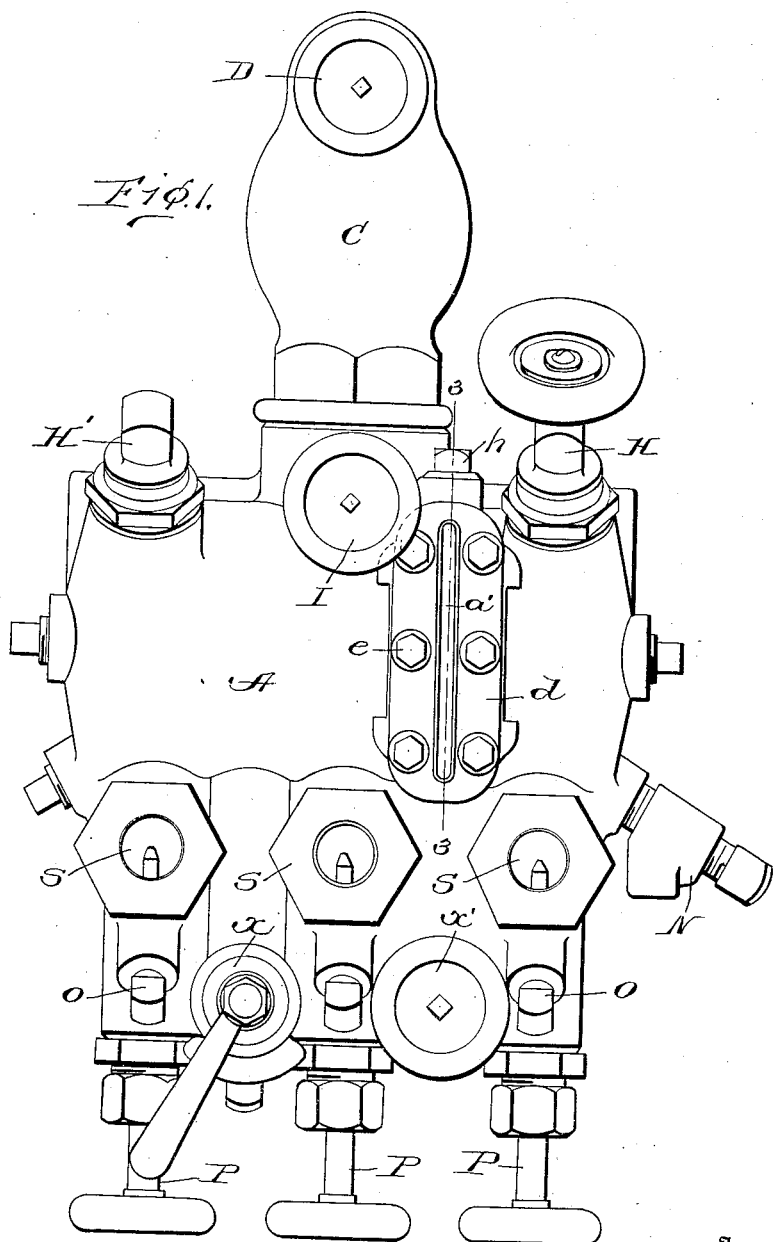

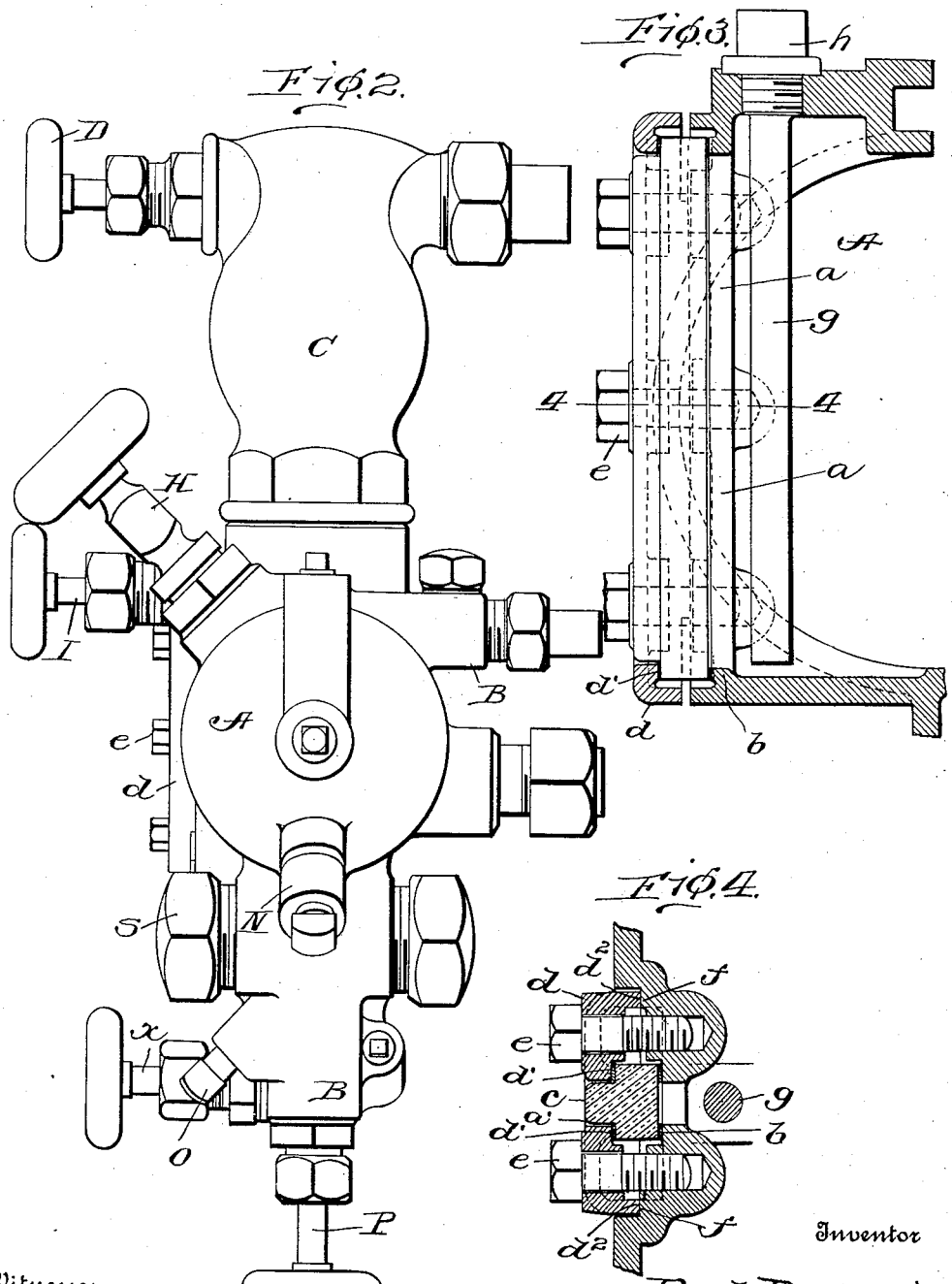

PAUL PANHORST, OF NEW YORK, N. Y., ASSIGNOR TO NATHAN MANUFACTURING COMPANY, OF NEW YORK, N. Y.

LOCOMOTIVE-LUBRICATOR.

1,033,457. Specification of Letters Patent. Patented July 23, 1912.

Application filed December 19, 1911. Serial No. 666,761.

*To all whom it may concern:*

Be it known that I, PAUL PANHORST, a citizen of the United States, and a resident of the borough of Bronx, in the State of New York, have invented a new and useful Improvement in Locomotive-Lubricators, of which the following is a specification.

It is important that the contents of the oil reservoir of a locomotive lubricator should be clearly indicated from the completely filled state to the completely empty state, or practically so, so that the operator may know whether he has oil enough in the reservoir to complete a certain run with the locomotive, or whether he must replenish the reservoir. Owing to the high steam pressures which prevail in modern locomotive practice this object has not been accomplished satisfactorily heretofore. With the high pressures which prevail, the use of ordinary tubular gage glasses is out of the question, on account of frequent breakage. The use of heavy plate glasses is practically indispensable. In some cases it was attempted to use a long glass of this kind, placed within the confines of the body of the lubricator, but difficulties were experienced on account of leakage along the long joint between the cover and the glass, and also on account of the fact that even with the use of reflectors behind the glass the line of demarcation between the oil and water remained indistinct—these difficulties being so serious as to forbid the use of the "long glass." As a rule, therefore, the oil indicator has consisted of an observation or "peep" glass of comparatively small diameter located near the top of the oil reservoir, serving to indicate only when the reservoir was nearly empty of oil, and not any of the intermediate points of the oil level.

It is my object to obviate these difficulties so as to permit of the safe use of a long glass indicator, so constructed, arranged and located as to be in a position convenient for observation and to indicate clearly to the operator the oil and water levels at all times from the full to the empty state of the oil reservoir. This result I obtain by a certain combination and arrangement of parts which will first be described in connection with the accompanying drawings, and will then be more particularly pointed out in the claim.

In the drawings—Figure 1 is a front elevation of a locomotive lubricator embodying my invention. Fig. 2 is a side elevation of the same. Fig. 3 is a vertical section on the line 3—3 Fig. 1, showing only so much of the body of the lubricator as is necessary for the proper understanding of the invention. Fig. 4 is a horizontal section on line 4—4 Fig. 3, omitting again all parts not directly concerned with the subject matter of the invention.

The invention has been devised with more special reference to the needs of a condensation-displacement balanced-pressure locomotive lubricator of the general type illustrated in U. S. Patent No. 844,281 granted to the Nathan Manufacturing Company as assignee of Leopold Kaczander, February 12, 1907, and I shall describe it in connection with that lubricator. A is the horizontal cylindrical oil-reservoir of said patented lubricator, provided with threaded necks for connecting the oil pipes which lead to the parts to be lubricated—one of which necks is shown at B, Fig. 2. C is the condenser, with its steam valve D; H, H', filler plugs; I, water valve; S, sight feeds, three in number, two for the engine cylinders and one for the air pump; P, corresponding feed regulating valves; N, waste valve; O, drain cocks to drain the sight feed chambers when necessary. The sight feeds are in a casting which is integral with, and located below and outside of, the oil reservoir. In the same casting are located cut-out valves $x$, $x'$, operating independently of the regulating valves P, the one to open and shut the cylinder feeds, and the other to open and shut the air pump feed. All these parts are to be found in modern sight-feed lubricators of the type in question, and do not require further description.

In the front of the oil reservoir—by which I intend that face of the oil reservoir on which the sight feeds are located for observation purposes—is formed a narrow vertical slot $a$ opening into the oil chamber, and extending from the bottom to the top of that chamber, or practically so, as seen in Fig. 3, said slot being bounded by a raised flat level seat $b$, cast on the exterior of the reservoir, against which is pressed the long thick plate glass $c$, the seat extending the whole length of the glass. The glass is held in position by means of the cover or cap $d$ and bolts $e$. The cover is provided with a longitudinal slot $a'$ of the same dimensions as, and registering with, the slot $a$ in the body A, said slot $a'$ being surrounded by narrow inner bearing ribs or faces $d'$ which take upon the outer edges of the glass, and has outer bearing ribs or faces $d^2$ which meet and abut against a seat $f$ formed on the exterior of the body of the oil reservoir, when the cover is fitted over and upon the glass. In this position the glass is held along its edges between the seat $b$ and the bearing ribs $d'$ which take upon the edges of the opposed faces of the glass, suitable packing gaskets being of course interposed between the parts $b$, $d'$, and the glass upon which they press. The cover has no contact with the body of the reservoir except along its outer bearing ribs or faces $d^2$ which abut against the seat $f$ in the body when the cover is drawn down upon the glass by the bolts $e$ which as seen in Fig. 4 are located between the outer and inner sets of bearing faces or ribs $d'$, $d^2$, in the cover. Under this arrangement when the bolts $e$ are screwed down, the inner bearing ribs $d'$ of the cover will be drawn firmly upon the glass, which will be clamped between said ribs and the seat $b$ so tightly as to effectively prevent all leakage.

I do not here claim broadly a liquid gage in which the glass is thus held by a cover which contacts with the glass along its inner ribs $d'$ and with the opposed body along its outer edges $d^2$ only, in connection with drawing bolts located in the cover in the interval between said inner and outer ribs, inasmuch as the same is the subject of an application in my name bearing Serial No. 643,946, on which Letters Patent will issue to the Nathan Manufacturing Company, as my assignee, on January 2, 1912. The shape of the glass in cross section is shown clearly in Fig. 4. It has a thick body with a reduced outer portion of shape and size to fill the slot $a$ in the cover. The seat $f$ is depressed in the body of the reservoir so that it will have an outer circumscribing rim, into which the cover will fit. Back of the slot $a$, and on a line longitudinally central with the glass $c$ is a depending rod $g$, which is located in the interior of the oil reservoir and is held in place by a screw plug $h$ screwing into a hole in the top of the reservoir, through which the rod can be inserted and withdrawn. This rod can be made of porcelain attached to the plug in any suitable permanent manner, or it may be made of metal and in one piece with the plug, and either nickled, or white enameled, or otherwise prepared, to furnish a proper external reflecting surface. So long as the rod is covered by oil it is not visible, or at least its color is not distinguishable from that of the oil; but when the lubricator has been feeding for some time, and part of the oil has been displaced by the water of condensation, that part of the rod covered by water will appear as a silvery white stripe, producing a very distinct line of demarcation between the oil and the water, thereby indicating very plainly to the observer the level of the oil in the reservoir. Should the rod become covered in time by gummy deposits from the oil, it is an extremely simple matter to remove the rod for purposes of cleaning. All that it is necessary to do being to remove the screw plug $h$, and with it the rod $g$.

Having described my improvement and the best way now known to me of carrying the same into practical effect, what I claim herein as new and desire to secure by Letters Patent is:—

In a condensation-displacement, balanced-pressure, sight-feed locomotive lubricator, an oil reservoir having in its front a vertical slot extending uninterruptedly from the bottom to the top thereof, a raised level portion on the exterior of the reservoir circumscribing said slot and formed with inner and outer seats for the glass and cover respectively, a slotted cover having inner and outer ribs, a glass held between the cover and inner seat to close the slot in the oil reservoir, bolts for drawing the cover tight against the glass, an opening in the top of the oil reservoir back of the seat against which the glass is held, a plug screwing into said opening, and a reflecting rod contained within the confines of the oil reservoir, fixed to and removable with the plug, and depending therefrom vertically in line with the slot in the oil reservoir, substantially as and for the purposes hereinbefore set forth.

In testimony whereof I affix my signature in presence of two witnesses.

PAUL PANHORST.

Witnesses:
GEORGE T. HARRIS,
C. E. ARMSTRONG.